United States Patent

Huffman

[15] 3,640,380
[45] Feb. 8, 1972

[54] PORTABLE FOOD AND DRINK CARRIER

[72] Inventor: William W. Huffman, Wilmette, Ill.
[73] Assignee: Marketers, Inc., Wilmette, Ill.
[22] Filed: Nov. 20, 1969
[21] Appl. No.: 878,342

[52] U.S. Cl..................................206/4, 211/73, 220/108, 224/45 R, 229/28 R, 229/52 B
[51] Int. Cl......................................A45c 11/20, B65d 5/44
[58] Field of Search.....................229/28, 30, 52 B; 220/108; 206/45.14, 4, 44.11; 224/45 R

[56] References Cited

UNITED STATES PATENTS

| | | | |
|---|---|---|---|
| 2,007,810 | 7/1935 | Oman | 229/52 B |
| 2,336,857 | 12/1943 | Gies et al. | 220/108 X |
| 2,808,191 | 10/1957 | Cramer | 229/30 |
| 3,073,644 | 1/1963 | Baker et al. | 229/52 B |
| 3,397,796 | 8/1968 | Watts | 206/45.14 X |
| 3,199,669 | 8/1965 | Straus et al. | 206/44.11 |
| 1,507,078 | 9/1924 | Mackie | 206/44.11 |

*Primary Examiner*—Leonard Summer
*Attorney*—Hill, Sherman, Meroni, Gross & Simpson

[57] ABSTRACT

A portable food and drink carrier has cup-supporting flaps partially cut from a sheet-form spine portion and hingedly connected thereto along an upper edge, and a circular flap aperture is sized to supportingly receive a cup when the flap is outwardly folded to a horizontal position. The spin portion may take the form of an enclosure for receiving food items, and the flap may include yieldable tabs extending radially inwardly to accept differently sized cups.

6 Claims, 3 Drawing Figure

PATENTED FEB 8 1972 3,640,380
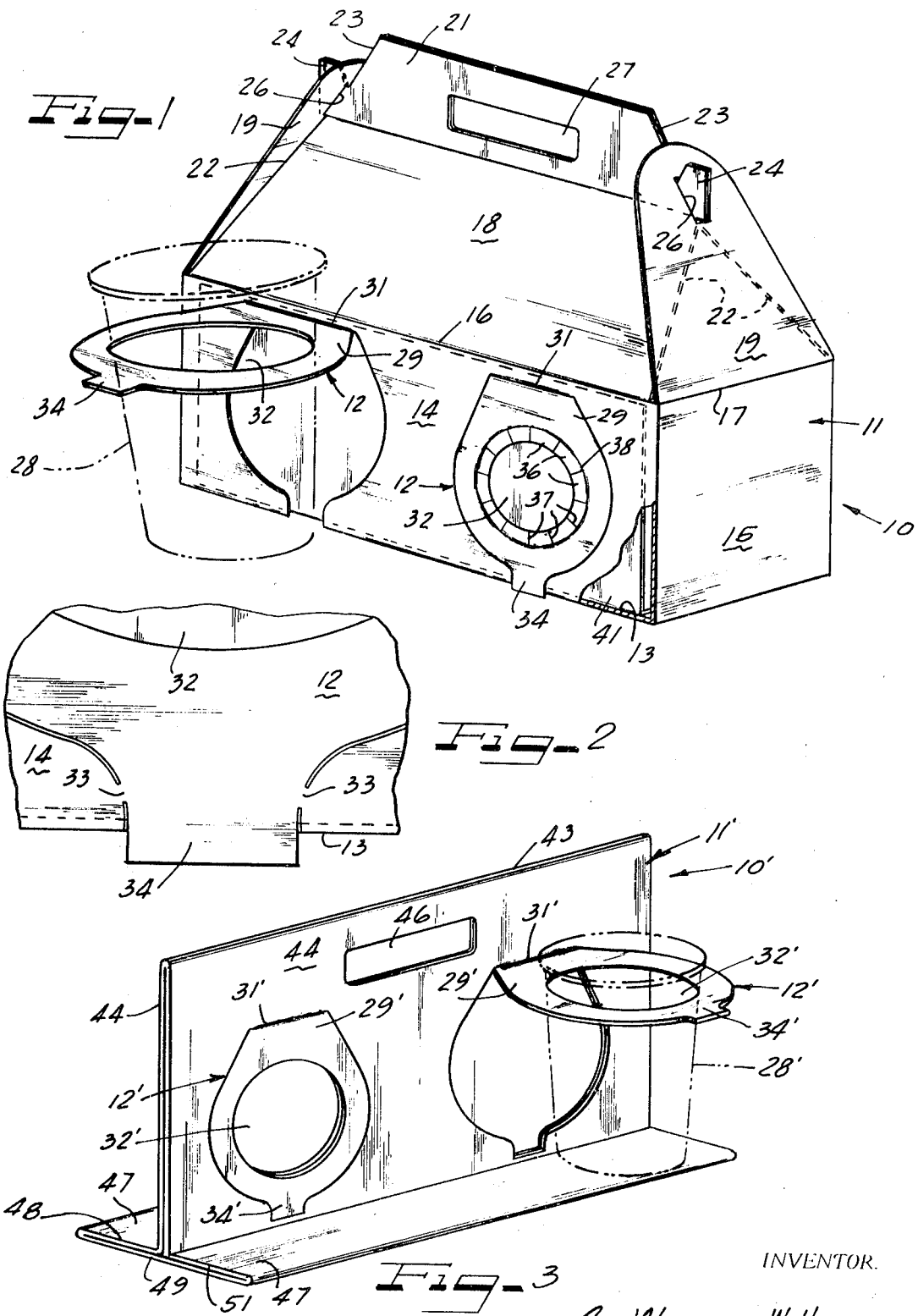
INVENTOR.
WILLIAM W. HUFFMAN
BY Hill, Sherman, Meroni, Gross, Simpson ATTORNEYS

PORTABLE FOOD AND DRINK CARRIER

BACKGROUND OF THE INVENTION

1. Field of the Invention

The present invention generally relates to portable carriers and more particularly refers to portable food and drink carriers having means for supportingly receiving disposable beverage cups.

2. Description of the Prior Art

Recently increasing popularity of fast service, carryout food centers, which emphasize low cost and customer convenience, has created a demand for an effective portable carrier capable of supporting a plurality of disposable beverage cups for convenient one-hand carrying. Also, a unitary carrier including a boxlike container or enclosure for receiving food items and cup supporting receptacles would substantially enhance the convenient transporting of large food and drink orders and would eliminate any necessity for separate paper bags for transporting the food items.

One form of food and drink carrier presently utilized in the fast service food industry comprises a shallow box-shaped member having vertically spaced, horizontal upper and lower wall portions. That form of container generally has circular or semicircular openings formed in the upper wall for laterally restraining beverage cups supported on the horizontal lower wall. When loaded with a full complement of cups, usually four in number, that form of container is so unstable as to preclude one-hand carrying without risk of spilling the beverage.

SUMMARY OF THE INVENTION

A portable drink carrier, constructed in accordance with the principles of the present invention, generally comprises a substantially rigid spine or body portion and at least one cup supporting flap attached along one edge to the spine and characterized by a circular aperture sized to supportingly grip tapered sidewalls of a disposable beverage cup.

One embodiment of the present invention contemplates providing a spine portion composed of sheet-form material, such as card stock, which is cut and folded to form a boxlike container or enclosure for receiving food items. In that embodiment, one or more of the cup-supporting flaps are partially cut from the box sidewalls and hingedly connected thereto along one edge, thereby to form a unitary carrier for transporting both food and drink items. With a cup wedged into the flap aperture, the flaps are held in an outwardly folded, cup-supporting position by lateral engagement of the cup with the box sidewalls.

In another form of the present invention, a carrier for convenient, one-hand transportation of a plurality of cups includes a spine portion composed of card stock folded to form at least one upstanding sidewall characterized by an oblong cutout forming a manually grippable handle portion and having a plurality of the cup supporting flaps partially cut from and hingedly connected to the rigid sidewall.

BRIEF DESCRIPTION OF THE DRAWINGS

FIG. 1 is an isometric view of one embodiment of a unitary portable food and drink carrier, constructed in accordance with the principles of the present invention;

FIG. 2 is a fragmentary enlarged plan view of a cup supporting flap of the present invention and illustrates tearable connecting webs; and FIG. 3 is an isometric view of an alternative embodiment of the present invention.

DETAILED DESCRIPTION OF CERTAIN PREFERRED EMBODIMENTS

Referring to the drawings, a portable food and drink carrier, constructed in accordance with the principles of the present invention, and generally indicated at 10 comprises means forming a spine or body portion 11 composed of sheet-form material and projecting appendages such as arm portions which form cup-supporting means including flaps as at 12 partially cut from the sheet-form material and hingedly attached thereto. The sheet-form material may be card stock or other suitable inexpensive material adaptable to being cut and embossed or scored for folding in the form of the carrier 10.

As illustrated in FIG. 1, one form of the present invention contemplates forming the spine or body portion 10 into an enclosure or a boxlike configuration for receiving food items, thereby to provide a unitary, portable carrier for conveniently and simultaneously transporting both food and drink items. The box-shaped enclosure 10 has a bottom wall 13, a pair of upstanding sidewalls as at 14 and end walls as at 15, each of which is sized for configured in accordance with requirements of an ultimate user to accommodate different types of food items.

To assist in keeping the food items warm, the sidewalls 14 and the end walls 15 are creased or scored as at 16 and 17, respectively, to form side and end closure flaps as at 18 and 19, respectively. In a closed position, the side closure flaps 18 are folded to incline inwardly of a longitudinal axis of the box and have upwardly bent upper edge portions as at 21. The upwardly bent or folded edge portions 21 are disposed in a face-to-face relationship to form a rigid, double-thickness rib extending longitudinally of the box. The end closure flaps 19 are folded inwardly of a transverse axis of the box-shaped spine portion 11 and join the sidewalls along tapered end edges 22 thereof, thereby to completely enclose the food receiving box.

Opposite end portions of the rigid rib are notched as at 23 to form a pair of upstanding locking tabs 24, 24. Slits 26 formed in each of the end closure flaps 19 lockingly engage the tabs 24 to retain the closure flaps 18 and 19 in a closed position.

Convenient handle means for manually transporting the carrier 10 include oblong, hand-width, mating slots formed in the pair of upstanding edge portions 21. Thus, the carrier 10 lends itself to convenient one-hand carrying in a manner similar to a suitcase.

In accordance with the principles of the present invention, one or more of the cup-supporting flaps 12 are partially cut from one or both of the sidewalls 14 for supportingly receiving beverage or drink cups as shown by phantom lines at 28. Each of the flaps 12 has a substantially annular configuration and is characterized by a radially outwardly offset portion 29 having an elongated upper edge 31 hingedly connected to an upper portion of the sidewalls 14 for permitting the flaps to be outwardly folded about the edge 31 to a cup-supporting position, as illustrated in a left-hand portion of FIG. 1. A circular aperture 32 formed in each of the flaps 12 is sized to grippingly receive the beverage cup 28 which has upwardly flared sidewalls. With the cup 28 wedged into the aperture 32, the flap is restrained against downwardly pivoting movement about the hinged connection or fold line 31 by lateral engagement of the cup with the sidewall 14, thereby forming a cantilever support for the cups in a stable manner not requiring horizontal support for the cup bottom.

To retain unused ones of the plurality of cup supporting flaps 12 in a noninterfering position, portions of the flap oppositely disposed from the hinged connection 31 are attached to the sidewalls by frangible or tear-out connecting webs as at 33, as best seen in FIG. 2, thereby to normally retain the flaps in a plane containing the sidewalls 14. When the card stock or other sheet-form material is die cut or otherwise initially formed, small portions of the flap outline are left uncut to form the connecting webs 33, which have a length permitting easy tearing by an ultimate user to enable folding the flaps to the cup-supporting position. To facilitate gripping of the flaps 12 to tear the connecting webs 33, the flaps have radially outwardly offset tab portions as at 34 extending slightly below the box bottom wall 13.

In order to accommodate beverage cups having various outer diametral dimensions, a circumferentially spaced series of radially inwardly extending yieldable tabs as at 36 are formed around a periphery of the flap aperture 32, as illustrated in a right-hand portion of FIG. 1. The yieldable tabs 36 are separated by a circumferentially spaced series of radially extending equal-lengthed slits as at 37, each terminating at a circular crease or fold line 38 extending coaxially of the circular aperture 32.

A grease-impervious sheet of material as at 41 is adhered to an inside surface of the sidewalls 14 and covers openings left in the sidewalls by cutting the flaps 12 therefrom. The covering sheet 41, which may be composed of waxed paper or other suitable material, seals the box sidewalls to enhance insulative characteristics of the box and to prevent grease staining of surfaces which may come into contact with the box sidewalls.

It is also contemplated by the present invention to provide a carrier 10', as illustrated in FIG. 3, adapted for enabling convenient one-hand carrying of a plurality of beverage cups without fear of spillage. In that form of the present invention, structural elements having a configuration similar to those described hereinabove for the embodiment illustrated in FIGS. 1 and 2 are identified with like reference numerals to which a prime has been added.

As illustrated in FIG. 3, means forming the spine or body portion 11' comprise sheet-form material, such as card stock, folded along a transverse line as at 43 to form a pair of upstanding, parallel sidewalls as at 44 disposed in a face-to-face relationship and having the cup supporting flaps 12' partially cut therefrom and hingedly connected thereto along upper edge portions as at 31'. The pair of upstanding sidewalls 44 form a rigid, double-thickness spine portion or support for the cup supporting flaps 12' and are characterized by elongated, hand-width, mating apertures as at 46 formed through an upper portion thereof to form a convenient, manually grippable handle for enabling one-hand carrying of the carrier 10'.

To enhance rigidity of the spine portion 11' and to provide a support base for the carrier 10', the sheet-form material is folded in a manner to form a pair of laterally outwardly extending, double-thickness wing portions as at 47 disposed along a lowermost edge of the sidewalls 44. In particular, the base portions or wings 47 have a laterally outwardly folded portion 48, a reverse bent portion 49 forming a bottom wall, and a doubled-over end portion 51 terminating at a front one of the sidewalls 44. Free ends of the sheet-form material forming the carrier 10' may be glued to retain the carrier in the assembled configuration, or interlocking tabs and slots may be provided for permitting convenient assembly.

Although those versed in the art may suggest various minor modifications, it should be understood that I wish to embody within the scope of the patent warranted hereon all such modifications as reasonably and properly come within the scope of my contribution to the art.

I claim as my invention:

1. A portable carrier comprising:
    means forming an upstanding spine portion composed of sheet-form material formed into a boxlike configuration adaptable for receiving food items,
    cup-supporting means including at least one substantially horizontally disposed flap connected along one edge to said spine portion,
        said flap being cut from the sidewalls of said box-shaped spine portion and hingedly connected thereto and having a substantially circular aperture formed therein sized to grippingly receive a disposable beverage cup, and
    grease impervious sheet-form material adhered to an inside surface of said sidewall having said flip cut therefrom and covering openings left by said flaps, thereby to form a portable unitary carrier with closed sidewalls for transporting both food and drink items.

2. A portable carrier as defined in claim 1 and further characterized by:
    handle means including an elongated slot formed in an upper portion of said spine portion and sized for manual engagement.

3. A portable carrier as defined in claim 1 and further characterized by:
    said flap portion having a substantially annular configuration and a radially outwardly offset portion having an elongated edge thereof hingedly connected to said spine portion for pivoting movement to a horizontal cup-supporting position.

4. A portable carrier as defined in claim 1 and further characterized by: means forming a circumferentially spaced series of yieldable tabs extending substantially radially inwardly of said circular aperture and being connected to said flap along a circular fold line extending coaxially of said cut out, thereby to adapt said cup supporting flap for grippingly receiving differently sized cups.

5. A portable carrier as defined in claim 4 and further characterized by:
    said means forming said yieldable tabs including a series of substantially equal-lengthed slits cut in said flaps and extending radially outwardly from a peripheral edge of said cut out and terminating at said circular fold line.

6. A portable carrier as defined in claim 1 and further characterized by:
    means forming tearable connecting webs interconnecting said sheet-form spine portion and said flap to normally retain said flip in a plane containing said spine portion and being tearable to enable outwardly folding said flap about said hingedly connected edge to a substantially horizontal cup-supporting position.

\* \* \* \* \*